United States Patent
Miyazawa et al.

(10) Patent No.: US 9,626,093 B2
(45) Date of Patent: Apr. 18, 2017

(54) DISPLAY APPARATUS, INFORMATION INPUT METHOD AND PROGRAM

(75) Inventors: Yusuke Miyazawa, Tokyo (JP);
Fuminori Homma, Tokyo (JP);
Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1430 days.

(21) Appl. No.: 12/839,280

(22) Filed: Jul. 19, 2010

(65) Prior Publication Data

US 2010/0283737 A1    Nov. 11, 2010

(30) Foreign Application Priority Data

Aug. 5, 2009    (JP) ................ P2009-182449

(51) Int. Cl.
*G06F 3/0488* (2013.01)
*G06F 3/023* (2006.01)

(52) U.S. Cl.
CPC .......... *G06F 3/0488* (2013.01); *G06F 3/0236* (2013.01); *G06F 3/04886* (2013.01)

(58) Field of Classification Search
CPC . G09G 5/373; G09G 5/00; H04B 1/38; G06F 3/02; G06F 3/00; G06F 3/041
USPC .................. 345/104, 156, 168, 169; 715/773
See application file for complete search history.

(56) References Cited

U.S. PATENT DOCUMENTS

| 7,477,231 | B2 | 1/2009 | Asai | |
|---|---|---|---|---|
| 2006/0017711 | A1* | 1/2006 | Pihlaja | 345/173 |
| 2009/0219251 | A1* | 9/2009 | Jung et al. | 345/170 |

FOREIGN PATENT DOCUMENTS

| JP | 2004-054589 | 2/2004 |
|---|---|---|
| JP | 2007-183787 | 7/2007 |

* cited by examiner

*Primary Examiner* — Tony N Ngo
(74) *Attorney, Agent, or Firm* — Paratus Law Group, PLLC (57) ABSTRACT

There is provided a mobile display apparatus applied to the display apparatus including a display screen; an operation area control unit that displays an operation area for a user to perform an input operation on the display screen; a display area control unit that displays a display area for displaying input information on the display screen; a touch panel that is provided to the display screen and detects an input operation performed by a user in the operation area; an arithmetic unit that selects input information based on the input operation detected by the device; and an input information presentation unit that presents the input information selected by the arithmetic unit in the display area to prompt the user to check the input information.

20 Claims, 11 Drawing Sheets

DISPLAY APPARATUS, INFORMATION INPUT METHOD AND PROGRAM

BACKGROUND OF THE INVENTION

Field of the Invention

The present invention relates to a display apparatus, an information input method and a program. Particularly, the present invention relates to a display apparatus having an interface that enables high-speed input of characters or the like, and an information input method and a program using the display apparatus.

Description of the Related Art

Figure 11:
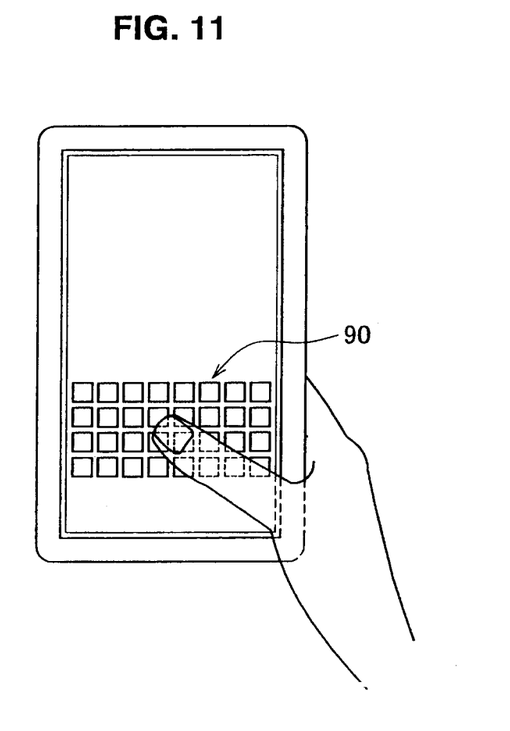
FIG. 11 is a view showing an example of a screen of a mobile device as a comparative example.

Recently, a device that incorporates a touch panel capable of detecting the finger position has been used to enable high-speed sensory character input. For the character input using the touch panel, a software keyboard 90 shown in FIG. 11 is displayed on a display screen, for example. A user touches the display position of the character to be input on the keyboard with a finger. It is thereby possible to input a character without using a hardware keyboard. The character input without use of a hardware keyboard is particularly employed in mobile devices because it enhances portability and offers convenience.

On the other hand, in the above method, a part of the software keyboard is inevitably hidden by the user's finger at the time of input as shown in FIG. 11, and it is thus difficult to perform high-speed character input like touch typing. Further, although the character input with use of the hardware keyboard allows a user to sense that a character is input by the pressing of the touching finger, the use of the software keyboard causes the lack of such a feeling of input.

Various techniques have been proposed to address such an issue. For example, in Japanese Unexamined Patent Application Publication No. 2007-183787, a software keyboard is displayed in the vicinity of an area to input a character (input screen). By reducing the distance between the software keyboard and the input screen, the moving distance of the user's line of sight is reduced, thereby improving the input speed.

Further, in Japanese Unexamined Patent Application Publication No. 2004-54589, only the home positions of in the QWERTY layout are displayed on a screen, and a user inputs characters by touching the software keyboard on the screen with fingers of both hands in the same manner as using a normal keyboard.

SUMMARY OF THE INVENTION

However, in the input method disclosed in Japanese Unexamined Patent Application Publication No. 2007-183787, it is necessary for a user to perform an input operation by placing a finger on a desired key of the keyboard on the screen. Further, because it is not different from a hardware keyboard in terms of being key input, it is necessary to display the software keyboard with a size allowing key input on the screen, which is extremely difficult in a mobile device having a small display screen.

Further, in the input method disclosed in Japanese Unexamined Patent Application Publication No. 2004-54589, it is difficult to intuitively grasp the keyboard size. Further, because the positions of buttons such as delete and space buttons vary by keyboard, it takes a long time for a user to become accustomed to the keyboard, which is inconvenient.

In light of the foregoing, it is desirable to provide a novel and improved display apparatus that enables high-speed input of information such as characters on a display screen, and an information input method and a program using the display apparatus.

According to an embodiment of the present invention, there is provided a display apparatus which includes a display screen; an operation area control unit that displays an operation area for a user to perform an input operation on the display screen; a display area control unit that displays a display area for displaying input information on the display screen; a device that is provided to the display screen and detects an input operation performed by a user in the operation area; an arithmetic unit that selects input information based on the input operation detected by the device; and an input information presentation unit that presents the input information selected by the arithmetic unit in the display area to prompt the user to check the input information.

In this configuration, the operation area and the display area are displayed separately on the display screen. The input operation performed by a user in the operation area is detected by the device such as a touch panel mounted on the display screen, input information is calculated based on the detected input operation, and the input information is displayed in the display area. A user can thereby perform the input operation while checking input information by looking only at the display area, without looking at the operation area.

This eliminates the need for a user to make a motion to place a finger on a given key of the software keyboard in the operation area, thereby allowing reduction of the area of the operation area. It is thereby possible to reduce the displacement of the input operation in the operation area. Further, a user can perform the operation without looking at the operation area. It is thereby possible to reduce the moving distance of the user's line of sight and thus ease of the tiredness of a user when operating the device.

The display area may be displayed at a position that allows checking whether the selected input information is information corresponding to the input operation performed by a user in the operation area.

The operation area and the display area may be displayed in positions not overlapping with each other on the display screen.

The determination unit that may determine whether to use or discard the input information depending on a user's response operation with respect to the input information displayed in the display area.

The operation area control unit may determine the operation area by using a position where a user first touches as a reference. A home position to serve as a reference of an input operation may be displayed in the operation area.

The arithmetic unit may calculate a relative displacement from the home position to the detected input operation and selects input information corresponding to the relative displacement.

A software keyboard having a key layout for an input operation performed by a user in the operation area may be displayed in the display area.

The input information presentation unit may present a position of the selected input information on the software keyboard in the display area.

The device may be a transmission touch panel capable of detecting the user's input operation.

The operation area control unit may update display of the operation area in response to a given operation on a reset button or a touch panel provided to the display apparatus, and the display area control unit may update display of the display area in response to update of display of the operation area.

According to another embodiment of the present invention, there is provided an information input method which includes an information input method comprising the steps of: displaying an operation area for a user to perform an input operation on a display screen of a display apparatus; displaying a display area for displaying input information on the display screen; detecting an input operation performed by a user in the operation area by using a device provided to the display screen; selecting input information based on the input operation detected by the device; and presenting the selected input information in the display area to prompt the user to check the input information.

According to another embodiment of the present invention, there is provided a program causing a computer to execute a process comprising processing of: displaying an operation area for a user to perform an input operation on a display screen of a display apparatus; displaying a display area for displaying input information on the display screen; detecting an input operation performed by a user in the operation area by using a device provided to the display screen; selecting input information based on the input operation detected by the device; and presenting the selected input information in the display area to prompt the user to check the input information.

According to the embodiments of the present invention described above, it is possible to input information such as characters at high speed on the display screen of the display apparatus.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that a mobile device to which a display apparatus according to an embodiment and its alternative example of the present invention described hereinbelow is applied is preferably a portable electronic device such as a cellular phone, a portable music player or a mobile information terminal (personal digital assistant (PDA)). However, the display apparatus according to the present invention may be applied to a notebook personal computer (PC) or a desktop PC.

The description will be given in the following order.
[1. Hardware Configuration of Mobile Device]
[2. Functional Configuration of Mobile Device]
[3. Operation of Mobile Device]
(Display Example 1: Character Input)
(Display Example 2: Update of Display)
(Display Example 3: Manual Setting of Display Range)
(Display Example 4: Manual Setting of Multiple Operation Areas)
(Display Example 5: Manual Setting of Each Area Position)
[4. Alternative Example of Applicable Device]
[1. Hardware Configuration of Mobile Device]

Figure 1:
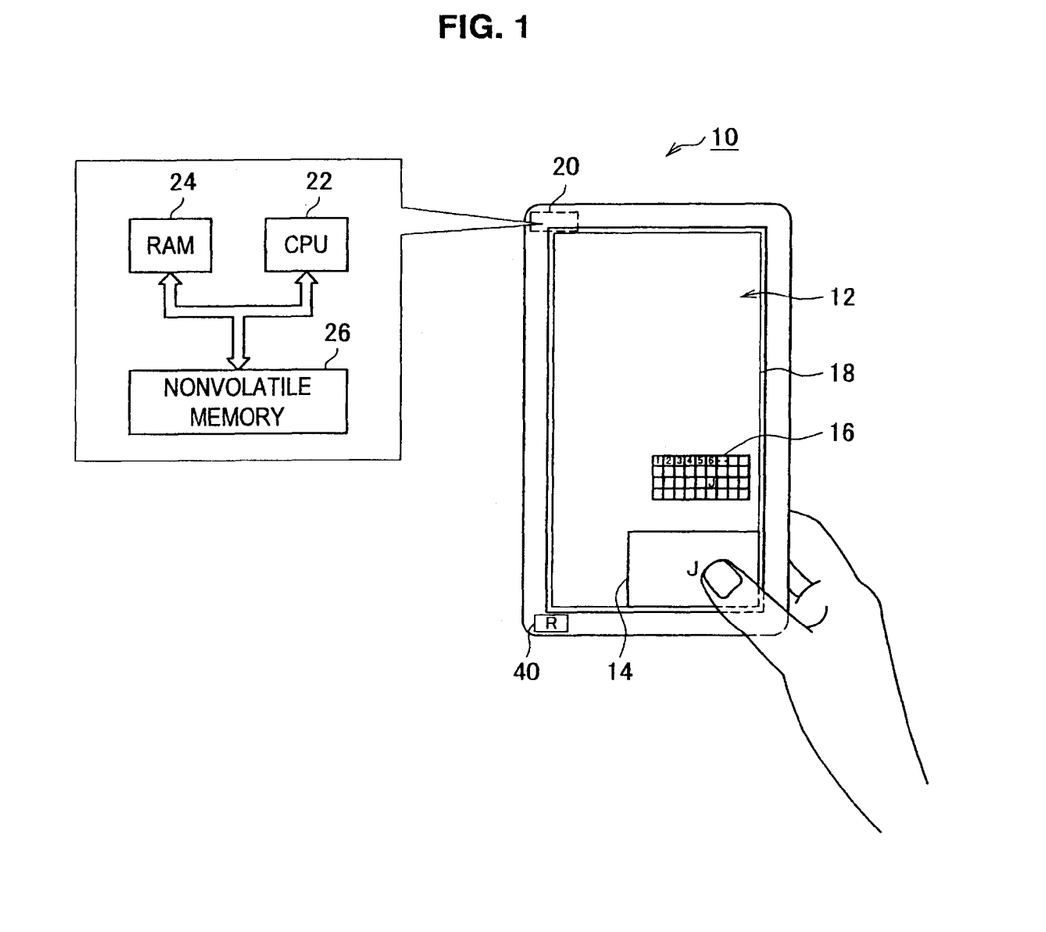
FIG. 1 is a view showing a mobile device and an example of its screen according to an embodiment of the present invention.

A hardware configuration of a mobile device according to an embodiment is described hereinafter with reference to FIG. 1. A mobile device 10 according to the embodiment is a device that has a transmission touch panel that incorporates a sensor capable of detecting a user's finger position on a display 12. The display 12 is a display screen that displays an operation area 14 for a user to perform an input operation, a display area 16 for displaying an input character corresponding to the input operation, and various other contents.

As the display 12, a liquid crystal display (LCD), an organic electroluminescence display (OELD) or the like may be used.

A touch panel 18 is mounted on the display 12, and the touch panel 18 detects an input operation performed by a user in the operation area 14. The touch panel 18 detects a finger position in the x-direction and the y-direction. In addition, the touch panel 18 preferably has a function to detect pressing against the display 12.

In the display area 16, input information such as a character predicted from the input operation detected by the touch panel 18 is displayed, and it is used for checking whether the input information is a character, a number or a symbol which a user intends to input. In FIG. 1, "J" is indicated as the input information in the display area 16 based on the operation of the finger in the operation area 14.

In the mobile device 10, a microprocessor 20 including a CPU 22, RAM 24 and nonvolatile memory 26 is embedded. Each memory temporarily stores information related to the input operation detected by the touch panel 18. The CPU 22 selects an input character or the like which is predicted from the input operation and makes control to display it in the display area 16. This is described in detail later. Note that the following hardware configuration can be also regarded as a hardware configuration of a display apparatus incorporated into a mobile device.

[2. Functional Configuration of Mobile Device]

Figure 2:
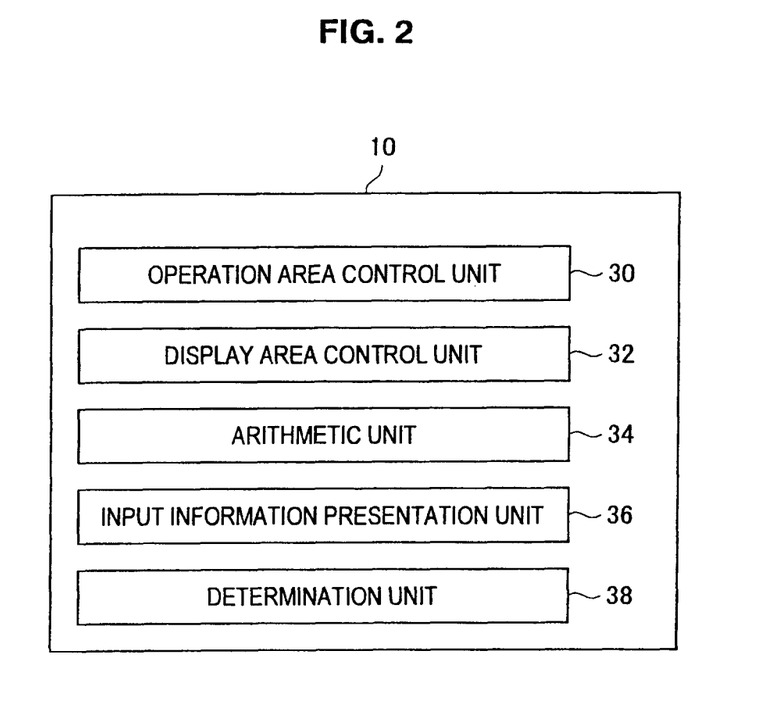
FIG. 2 is a functional block diagram of the mobile device according to the embodiment.

The mobile device 10 according to the embodiment has a functional configuration shown in the functional block of FIG. 2. Specifically, the mobile device 10 includes an operation area control unit 30, a display area control unit 32, an arithmetic unit 34, an input information presentation unit 36, and a determination unit 38.

The operation area control unit 30 displays the operation area 14 for a user to perform an input operation on the display 12. In the operation area 14, a home position to serve as a reference of the input operation is displayed. In FIG. 1, "J" is displayed as the home position. The operation area control unit 30 determines the operation area 14 by using the position where a user's finger first touches as a reference.

The display area control unit 32 displays the display area 16 for displaying input information corresponding to the input operation on the display 12. In the display area 16, a software keyboard having a key layout of the input operation performed by a user in the operation area 14 is displayed in a condensed manner.

In this embodiment, the display area 16 is used for checking as to whether an input character is correctly selected in response to the input operation performed by a user. It is thus not necessary to display a software keyboard with the size that allows a user's finger to tap each key of the software keyboard as in related art. Although the use of a software keyboard in the QWERTY layout is assumed in this embodiment, another key layout may be used.

The arithmetic unit 34 calculates input information based on the input operation of a user which is detected by the touch panel 18. Specifically, the arithmetic unit 34 calculates a relative displacement from the home position based on the input operation detected by the touch panel 18 and selects an input character corresponding to the relative displacement according to the QWERTY key layout.

Note that it is only necessary as the input operation to obtain the relative displacement of a finger from the home position in the operation area 14. It is thus not necessary to display a software keyboard in the operation area 14.

According to the above-described character input method, the operation area 14 and the display area 16 are displayed separately, and a user can thereby perform an input operation while checking an input character by looking only at display area 16, without looking at the operation area 14. This eliminates the need for a motion to place a finger on a given key of the keyboard on the screen, which has been needed in the input operation by a software keyboard according to related art, in the mobile device 10 according to the embodiment, and it is thus possible to reduce the area of the operation area 14. Consequently, a user can perform the input operation by moving the finger only slightly, which enables the character input at a higher speed than the conventional input operation that taps a software keyboard or a hardware keyboard. Further, because the method eliminates the need for the operation to actually tap a key on the screen, a user can perform the input operation without looking at the operation area. It is thereby possible to reduce the moving distance of the user's line of sight, which eases of the tiredness of the user when operating the mobile device 10.

The input information presentation unit 36 presents an input character at a given position on the condensed software keyboard shown in the display area 16. At this time, the input information presentation unit 36 displays the display area 16 at the position that allows checking whether a displayed input character is information corresponding to the user's input operation. For example, if the operation area 14 and the display area 16 are placed to overlap with each other, the display area 16 is partly hidden by the user's hand, and the checking is not readily made, which makes high-speed character input difficult in some cases. Therefore, it is preferred that the operation area 14 and the display area 16 are displayed in the positions not overlapping with each other on the display 12. However, the operation area 14 and the display area 16 may partly overlap as long as a user can check the input information.

The determination unit 38 determines whether to use or discard the input character depending on a user's response operation with respect to the input information displayed in the display area 16. The user's response operation may be release of a finger, for example. In this case, the determination unit 38 detects the release of a finger and determines to discard the input information according to the detection. Based on the determination, the display area control unit 32 updates the display in the display area 16 and erases the display of the input character. The response operation performed by a user to direct whether to use or discard the input information is not limited to "release", and it may be another predetermined operation such as a press or a tap of a finger. For example, the determination unit 38 may detect a change in finger pressure and determine to discard the input information when the pressure change exceeds a predetermined threshold.

The switching display of the home position (the update of display of the operation area 14) is performed as follows by using a reset button 40 in FIG. 1. When the reset button 40 is pressed, the determination unit 38 determines to discard the input character in response thereto.

Based on the determination, the operation area control unit 30 updates the display of the operation area 14 and switches the home position. Further, the display area control unit 32 updates the display of the display area 16 in response to the update of the display of the operation area 14. For example, when the display of the operation area 14 is updated by the update of the display, the display of the character displayed in the software keyboard of the display area 16 is also erased.

The mobile device 10 does not necessarily has the reset button 40. In this case, a method of using a "long press" by a user may be used as an example of the switching display of the home position. In the case of canceling the input operation after moving the finger away from the home position, a user makes a "long press" that keeps the finger touching the touch panel 18 for several seconds. Then, the determination unit 38 executes the switching display of the home position in response to the user's response operation. The user's response operation is not limited to the "long press", and it may be another predetermined operation such as a double tap.

Commands to the respective functional elements described above are executed by a dedicated control device or the CPU 22 that executes a program. The program for executing a character input process described hereinbelow is prestored in the RAM 24 or the nonvolatile memory 26, and the CPU 22 reads and executes each program from such memory to thereby implement each function of the operation area control unit 30, the display area control unit 32, the arithmetic unit 34, the input information presentation unit 36 and the determination unit 38.

[3. Operation of Mobile Device]

Figure 3:
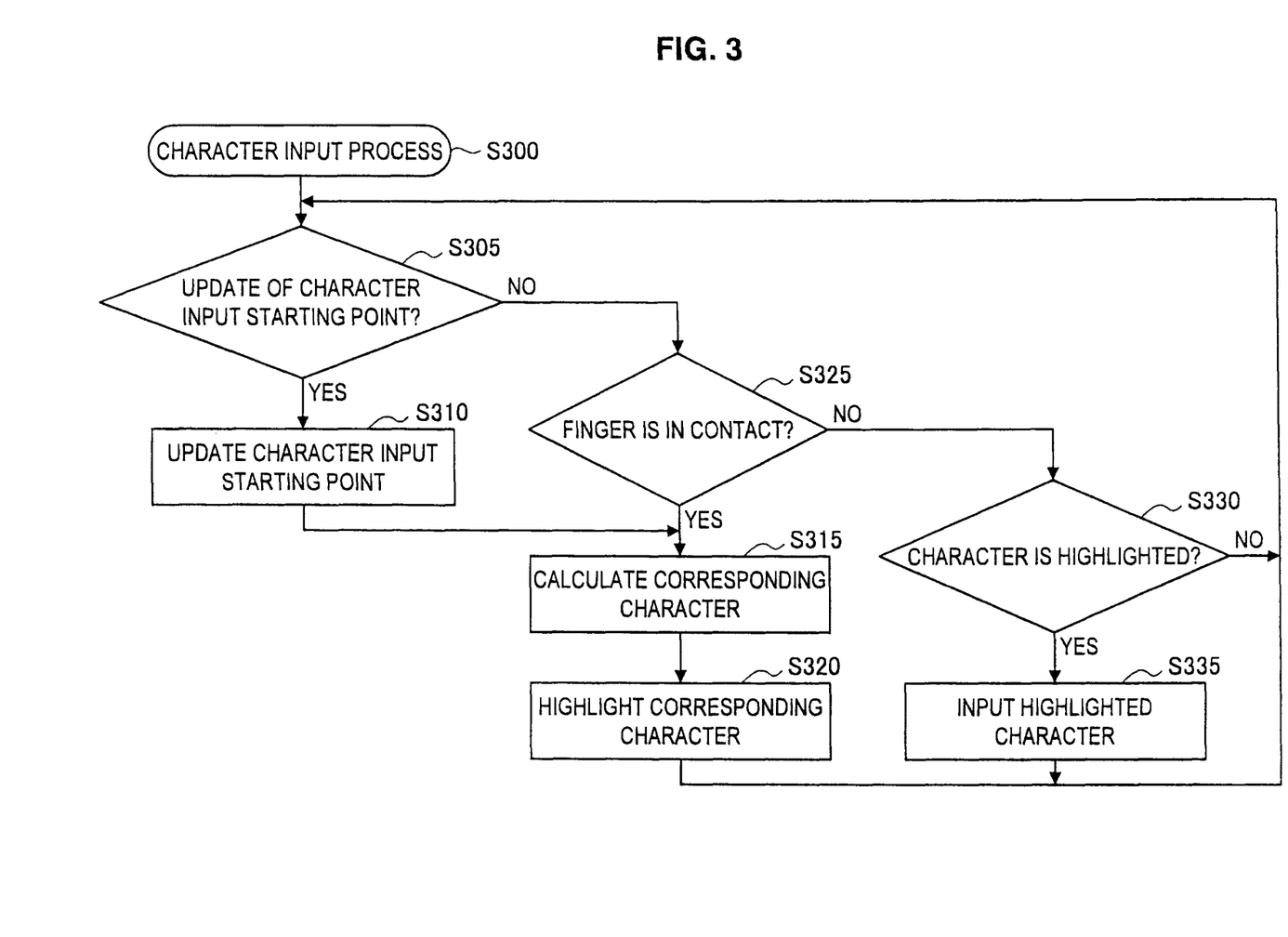
FIG. 3 is a flowchart showing an information input process executed in the mobile device according to the embodiment.

An input operation of the mobile device 10 according to the embodiment is described hereinafter with reference to FIG. 3. FIG. 3 is a flowchart showing the character input process that is executed by the mobile device 10. Although the input of a character is described hereinafter by way of illustration, it is equally applicable to the input of a symbol, a number or the like, other than the character. Note that the following operation can be also regarded as the operation of a display apparatus incorporated into the mobile device 10.

When the character input process is started in the step S300, the determination unit 38 determines whether or not to update a character input starting point in the step S305. The character input starting point is always updated at the start of character input. An example of the case where the character input starting point is updated is described. The case where the character input starting point is updated automatically is shown in the upper part of FIG. 4. In this example, after "k" is input, "e" is input, and "y" is input, when a character is not input for a predetermined threshold $D_{th1}$ (sec) or longer, the determination unit 38 determines to update the character input starting point automatically.

Figure 4:
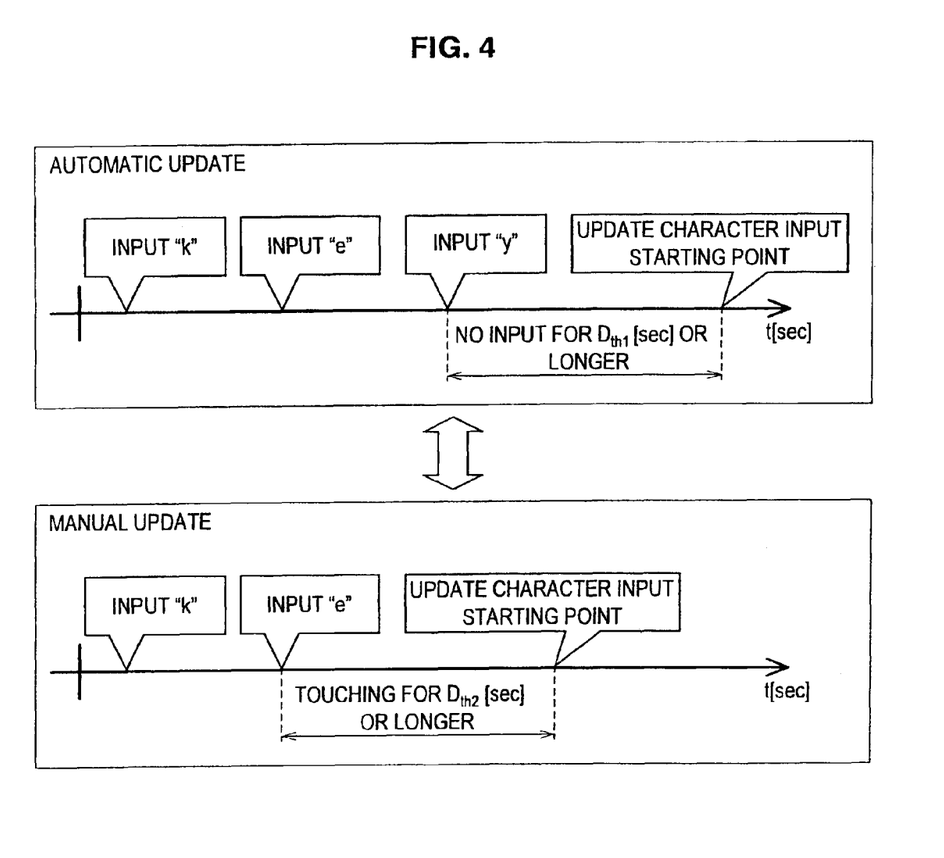
FIG. 4 is a view showing an example of a character input method executed in the mobile device according to the embodiment.

On the other hand, the case where the character input starting point is updated manually is shown in the lower part of FIG. 4. In this example, after "k" is input and "e" is input, when a finger keeps touching the operation area 14 for a predetermined threshold $D_{th2}$ (sec) or longer ("long press"), the determination unit 38 determines to update the character input starting point in response to the update operation (long press) by a user, and the point is the character input starting point. The threshold $D_{th1}$ and the threshold $D_{th2}$ may be the same value or different values.

When the character input is started at the present moment, the process proceeds to the step S310, and the operation area control unit 30 updates the character input starting point and, at the same time, switches the display so that the home position corresponds to the finger touching position. The home position "J" is thereby switched to the finger touching position as shown in FIG. 1.

The process then proceeds to the step S315, and the arithmetic unit 34 calculates the displacement of the finger indicating the distance that the user moves the finger from the home position. Based on the displacement, the arithmetic unit 34 selects a corresponding character according to the predetermined rule of the key layout. Although the relationship between a displacement and a character to be selected is arbitrarily settable, the character corresponding to the displacement is selected according to the QWERTY layout in this embodiment.

Then, in the step S320, the display area control unit 32 highlights the character selected by the arithmetic unit 34 in the display area 16. In this embodiment, the character is highlighted at the position of the selected character in the QWERTY layout. In this embodiment, the character may be displayed in a highlighted fashion such as coloring, boldface, reverse or hatching for easier checking by a user.

While the user's finger moves touching the touch panel 18 without satisfying the condition to update the character input starting point, the routine in the steps S305, S325, S315 and S320 is executed. The displacement from the home position is thereby recalculated according to the movement of the user's finger, and the selected character is highlighted in the display area 16 based on the displacement. Thus, while the routine is executed repeatedly, the character highlighted in the display area 16 varies according to the displacement.

After that, when the user's finger is moved off the touch panel 18 without satisfying the condition to update the character input starting point, the step S330 is executed subsequent to the steps S305 and S325. In this step, when the character displayed in the display area 16 is being highlighted, the determination unit 38 determines to use the highlighted character as input information. While the routine in the steps S305, S325, S330 and S335 is executed repeatedly in this manner, the characters desired by the user are sequentially input to the mobile device 10. On the other hand, when the character displayed in the display area 16 is not being highlighted, the determination unit 38 determines not to input any character, and the process returns to the step S305.

As described above, according to the character input process using the mobile device 10 of the embodiment, it is possible to input characters on the touch panel 18 at high speed. Specifically, in the character input according to the embodiment, the operation area 14 and the display area 16 are displayed separately. In the operation area 14, the point which a finger first touches is defined as the home position of the QWERTY keyboard. The home position is the character input starting point. Next, the displacement of the finger from the home position is calculated, and the character is selected according to the displacement. The selected character is highlighted in the display area 16. If a user confirms that the character highlighted in the display area 16 is a character to be input, the user takes the finger off the touch panel 18. The input of the highlighted character is thereby completed.

According to the character input method described above, because the operation area 14 and the display area 16 are displayed separately, a user can perform the input operation by looking only at the display area 16 without looking at the operation area 14. This eliminates the need for a motion to place a finger on a given key of the keyboard on the operating screen, which has been needed according to related art, in the mobile device 10 according to the embodiment, and it is possible to reduce the area of the operation area 14. Consequently, a user can perform the input operation by moving the finger only slightly, which enables the character input at a higher speed than the conventional input operation that taps a software keyboard or a hardware keyboard. Further, because the method eliminates the need for the operation to actually tap a key on the screen, a user can perform the operation without looking at the keyboard. It is thereby possible to reduce the moving distance of the user's line of sight, which eases of the tiredness of the user when operating the mobile device 10.

As described above, according to the embodiment, it is possible to input characters at high speed by using one finger with the small displacement. Further, because the need for a motion to tap a key such as a conventional software keyboard is eliminated, high-speed input becomes possible by touch typing on the touch panel 18 when the feeling of the finger becomes accustomed to the relationship between the distance from the home position and the selection of a character. Further, the screen area necessary for character input, i.e. the area of the operation area 14, can be smaller compared to related art. This enables downsizing of the device. This is significantly effective particularly for portable electronic devices. Furthermore, because the operation area 14 can be reduced, it is possible to display each area easily without the need to change the layout of an operation part when holding the device vertically and holding it horizontally.

(Display Example 1: Character Input)

Figure 5:
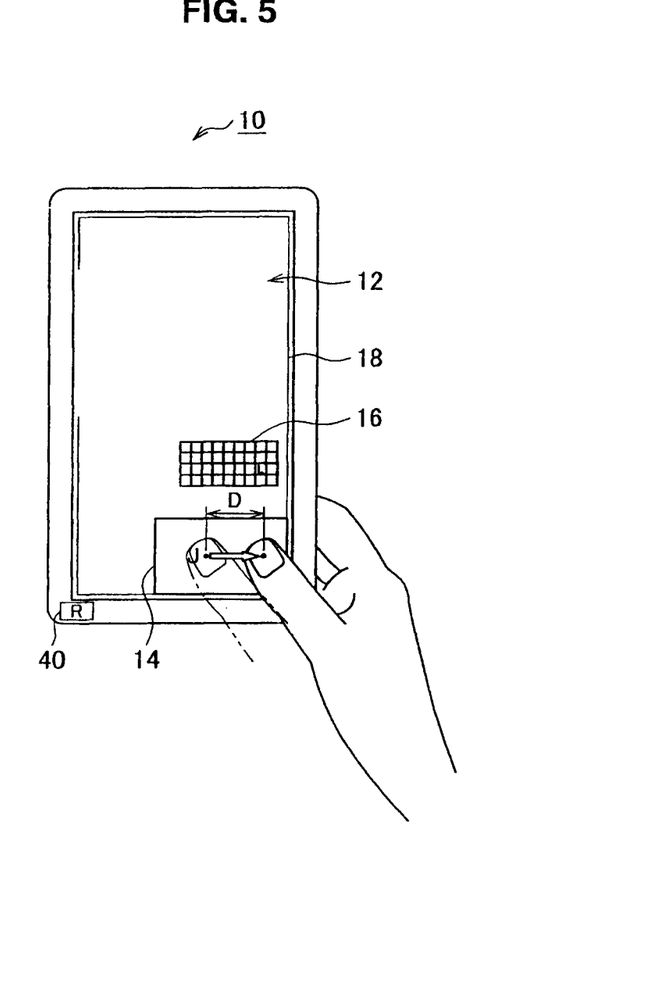
FIG. 5 is a view to describe an example of an input operation of the mobile device according to the embodiment.

Regarding the above-described character input method, a display example 1 is visually described as an example of display with reference to FIG. 5. When the update of the character input starting point is executed in the step S310, the operation area 14 is displayed on the display 12, and further the position displaying the home position "J" is updated according to the touching position of the user's finger as shown in FIG. 5. Then, when the user slides the finger to the right, a displacement D from the home position is calculated, and a character corresponding to the displacement D is selected. As described earlier, the relationship between a displacement and a character to be selected is arbitrarily settable. In this example, the character "L" is selected corresponding to the displacement D. "L" is thereby highlighted in the display area 16. The condensed software keyboard in the QWERTY layout is shown in the display area 16, and "L" is highlighted at the key position of "L" in the layout, thereby allowing a user to intuitively recognize the selected character. If the user takes the finger off in this state, the input of "L" is confirmed. If, on the other hand, the user further moves the finger without taking it off, the process in which the displacement D is recalculated, the character corresponding thereto is selected, and the selected character is highlighted at a given position of the display area 16 is repeated.

In this method, there is no need to display a conventional software keyboard for direct tapping of a key in the operation area 14, and the operation area 14 can be displayed with a small size. This allows reduction of the finger's motion (displacement) for character input, thereby enabling high-speed character input. Further, the display area 16 can be displayed with the size that allows a user to check the selected character, and the display range can be smaller than a conventional software keyboard. This allows effective utilization of the other part of the display 12.

(Display Example 2: Update of Display)

Figure 6:
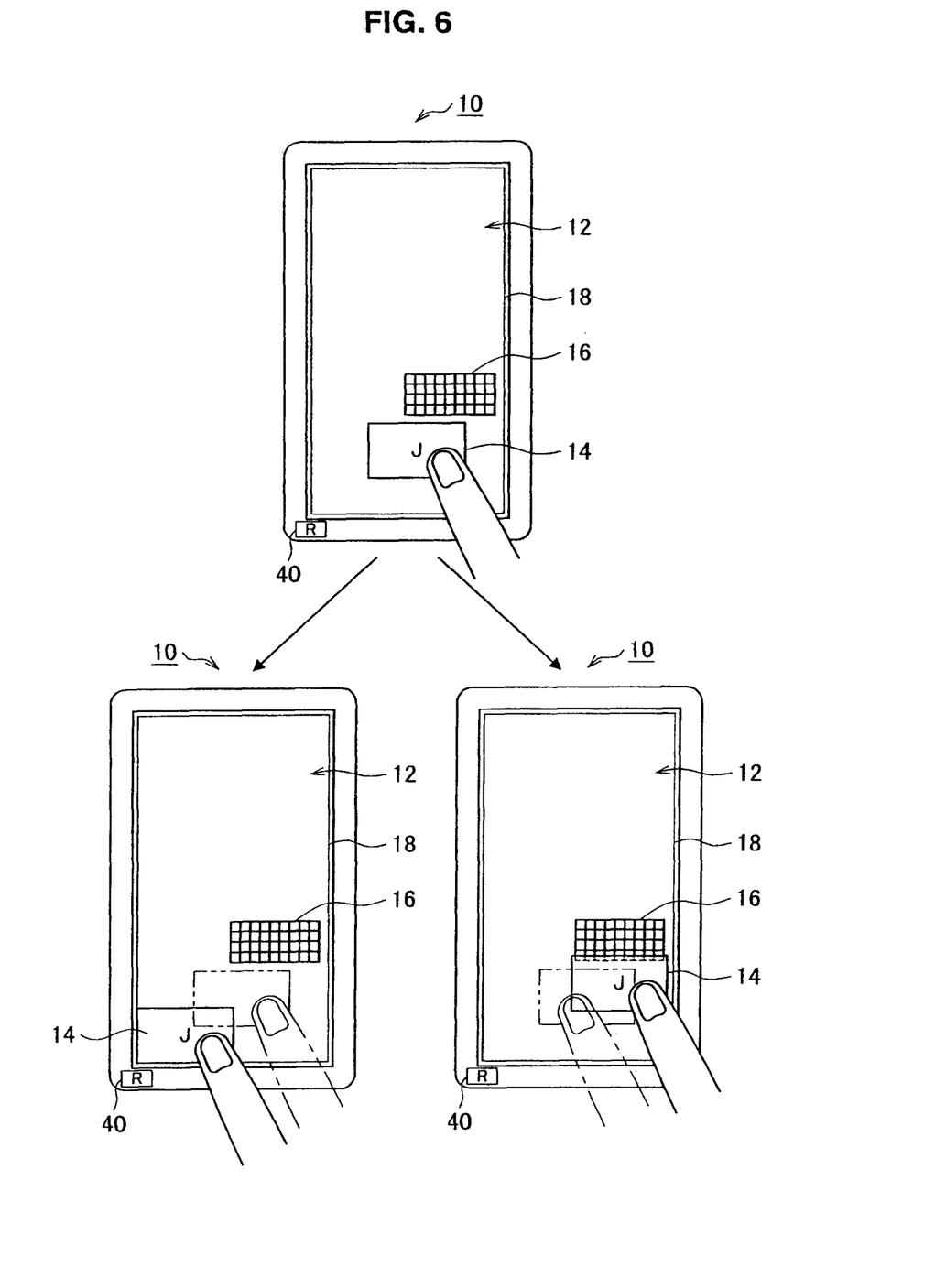
FIG. 6 is a view to describe another example of an input operation of the mobile device according to the embodiment.

A display example 2 is visually described with reference to FIG. 6. When the update of the character input starting point is executed in the step S310, the operation area 14 is displayed and further the home position "J" is displayed in the operation area 14 according to the touching position of the user's finger as shown in FIG. 6. Then, when no input is made for $D_{th1}$ (sec) or longer or when a user makes a long press as shown in FIG. 4, the step S310 is executed again, and the operation area 14 is updated and displayed at the lower left of the display 12 and further the home position "J" is updated and displayed according to the touching position of the user's finger as shown in the lower left of FIG. 6.

The operation area 14 may be displayed at any position in the display 12 according to the touching position of the user's finger. However, the display area 16 is displayed at the position that allows checking whether the selected character (input information) is the character corresponding to the user's input operation. For example, if the operation area 14 and the display area 16 are placed overlapping with each other, the display area 16 is partly hidden by the user's hand, which causes a difficulty in checking the selected character, the need to move the hand for checking the selected character or the like. It is thus is preferred that the operation area 14 and the display area 16 are displayed separately in the positions not overlapping with each other on the display 12. However, the operation area 14 and the display area 16 can partly overlap as long as a user can check the selected character as shown in the lower right of FIG. 6.

(Display Example 3: Manual Setting of Display Range)

Figure 7:
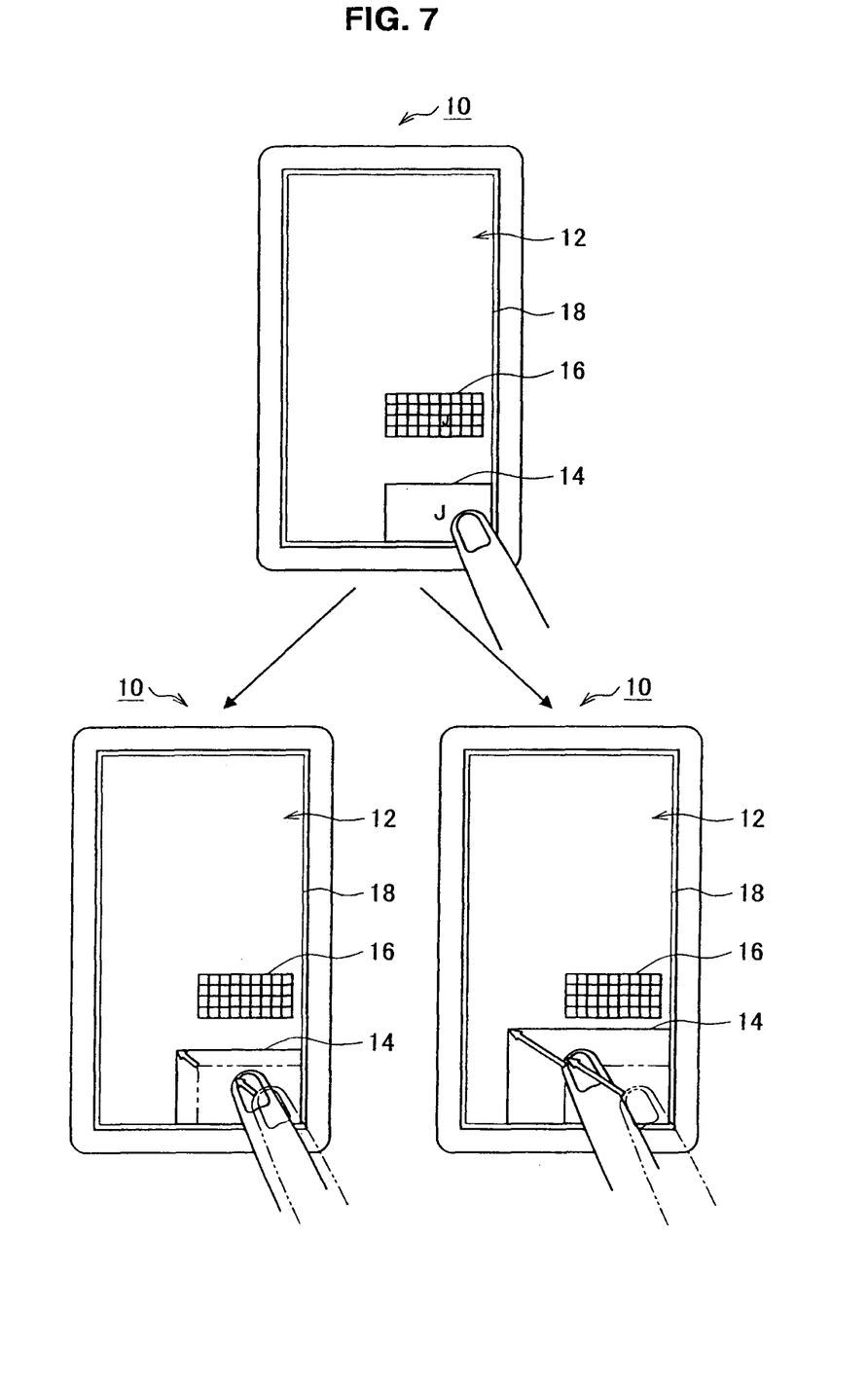
FIG. 7 is a view to describe another example of an input operation of the mobile device according to the embodiment.

A display example 3 is visually described with reference to FIG. 7. The process is not shown in the character input process of FIG. 3. The case where the relationship between a displacement and a character to be selected is arbitrarily settable is shown in this example. For example, as an example in which a user can arbitrary set the relationship between a displacement and a character to be selected, the user first moves the finger to the end (the right end in this example) of the display 12 to thereby shift the operation area 14 to the end of the display 12 as shown in the upper center part of FIG. 7.

Then, the user displaces the finger obliquely from the end to adjust the size and the aspect ratio of the operation area 14. The aspect ratio of the operation area 14 is decided by the direction of the displacement of the finger. Further, the size (area) of the operation area 14 is decided by the amount of the displacement of the finger. The lower left part of FIG. 7 shows the state where the operation area 14 is slightly enlarged compared to the operation area 14 shown in the upper part of FIG. 7. The lower right part of FIG. 7 shows the state where the operation area 14 is further enlarged. The user can thereby manually set the relationship between a displacement of a finger and a character to be selected, which reduces input errors.

(Display Example 4: Manual Setting of Multiple Operation Areas)

Figure 8:
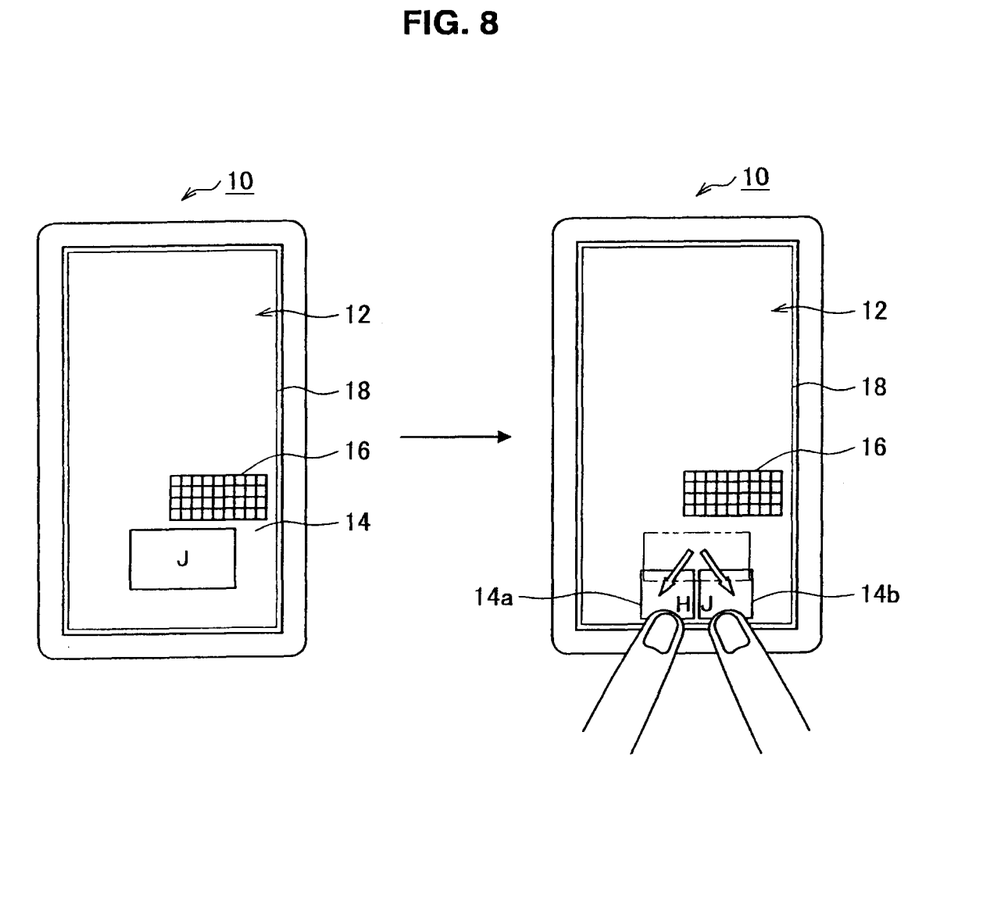
FIG. 8 is a view to describe another example of an input operation of the mobile device according to the embodiment.

A display example 4 is visually described with reference to FIG. 8. The process is not shown in the character input process of FIG. 3. In this example, the operation area 14 is split in two. For example, a user splits the operation area 14 shown in the left part of FIG. 8 into a left finger operation area 14a and a right finger operation area 14b by using both fingers. This enables the parallel input operation using the both fingers. The home positions are displayed respectively in the both areas 14a and 14b. A left finger home position "H" is displayed in the left finger operation area 14a, and a right finger home position "J" is displayed in the right finger operation area 14b in this example.

(Display Example 5: Manual Setting of Each Area Position)

Figure 9:
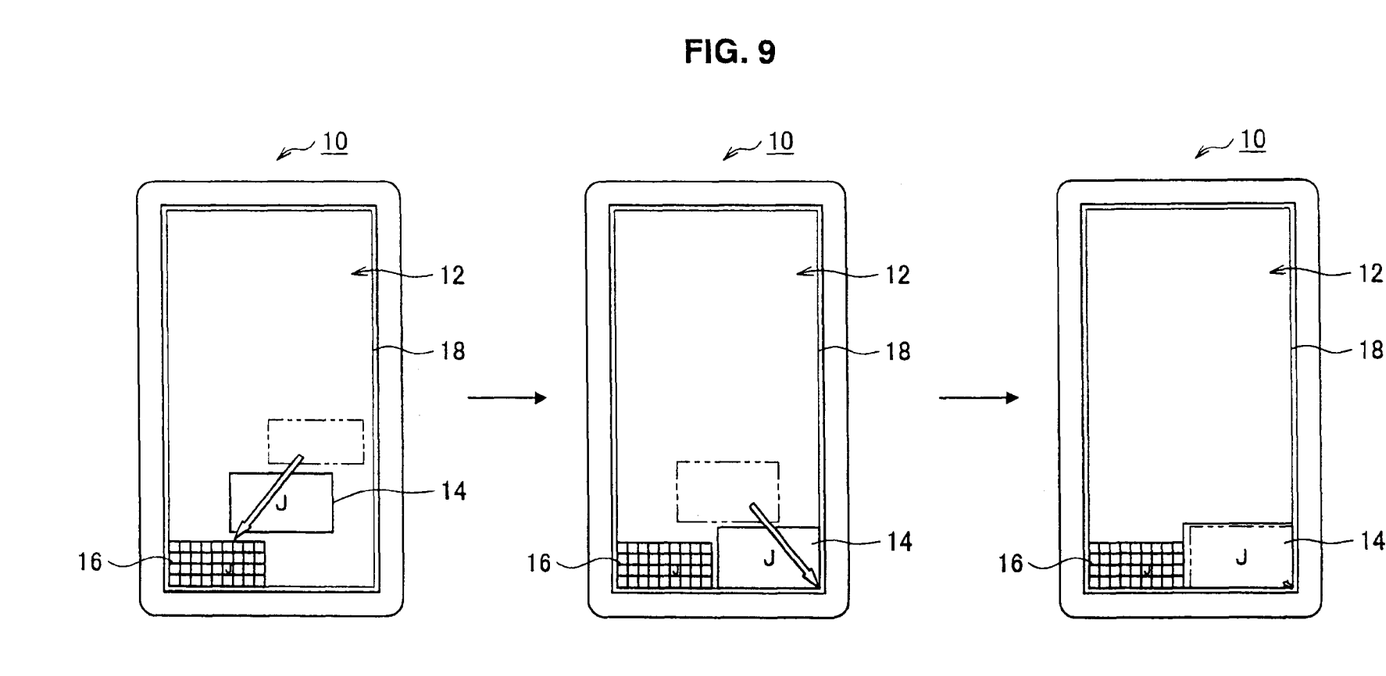
FIG. 9 is a view to describe another example of an input operation of the mobile device according to the embodiment.

A display example 5 is visually described with reference to FIG. 9. The process is not shown in the character input process of FIG. 3. In this case, not only the operation area 14 but also the display area 16 can be moved manually. For example, a user first touches the display area 16 with the finger and moves the display area 16 to the left end of the display 12 as shown in the leftmost part of FIG. 9. The user then touches the operation area 14 with the finger and moves the operation area 14 to the right end of the display 12 as shown in the center part of FIG. 9. It is thus possible to display the display area 16 at the position that is easy to be viewed by a user, and display the operation area 14 at the position that is easy to be operated by a user, thereby enabling user-friendly display regardless of the user's dominant hand. Further, a user can enlarge the operation area 14 by touching the operation area 14 with the finger. The display area 16 is also enlargeable.

[4. Alternative Example of Applicable Device]

Figure 10:
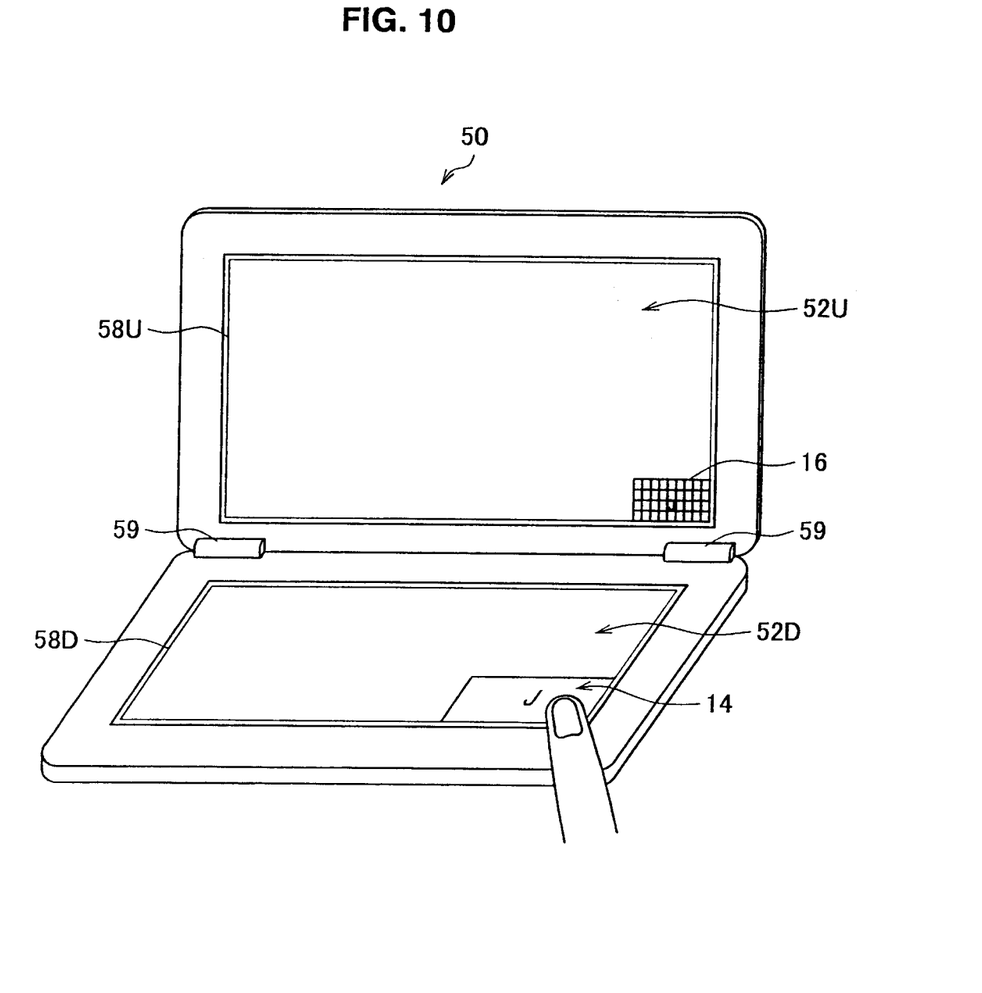
FIG. 10 is a view showing a mobile device and an example of its screen according to an alternative example.

The display apparatus capable of executing the character input operation described above is also applicable to an electronic device 50 shown in FIG. 10. The electronic device 50 has two screens: an upper display 52U and a lower display 52D. A touch panel 58U is mounted on the upper display 52U, and a touch panel 58D is mounted on the lower display 52D. The electronic device 50 is foldable by a hinge mechanism 59 attached at the center, thus having a portable structure.

The display area 16 is displayed in the upper display 52U. The operation area 14 is displayed in the lower display 52D. The operation area 14 and the display area 16 may be displayed in either display. The character input operation using the electronic device 50 is as described above.

In this application also, by separate display of the operation area 14 and the display area 16, the display range of each area can be small and high-speed character input is possible. Particularly, because the electronic device 50 includes two screens and thus has a wide display range, it is possible to open another window or browse a plurality of contents in the remaining display region while displaying the operation area 14 and the display area 16.

In the above embodiment, the operations of the respective units are related to each other and may be replaced with a series of operations or a series of processing in consideration of the relation to each other. The embodiment of the display apparatus can be thereby converted into an embodiment of an information input method and an embodiment of a program for causing a computer to implement the functions of the display apparatus.

Therefore, there can be provided an information input method including the steps of displaying the operation area 14 for a user to perform an input operation on the display 12, displaying the display area 16 for displaying an input character on the display 12, detecting an input operation performed by a user in the operation area 14 by using a device (touch panel) mounted on the display 12, selecting an input character based on the input operation detected by the device, and presenting the selected input character in the display area 16 to prompt the user to check the input character.

Further, there can be also provided a program causing a computer to execute a process including the processing of displaying the operation area 14 for a user to perform an input operation on the display 12, displaying the display area 16 for displaying an input character on the display 12, detecting an input operation performed by a user in the operation area 14 by using a device (touch panel) mounted on the display 12, selecting an input character based on the input operation detected by the device, and presenting the selected input character in the display area 16 to prompt the user to check the input character.

Note that, in this specification, the steps shown in the flowchart include not only the processing executed in chronological order according to the sequence described therein but also the processing executed in parallel or individually, not necessarily processed in chronological order. Further, the steps processed in chronological order can be performed in a different sequence as appropriate depending on the circumstances.

It should be understood by those skilled in the art that various modifications, combinations, sub-combinations and alterations may occur depending on design requirements and other factors insofar as they are within the scope of the appended claims or the equivalents thereof.

For example, although the character indicating the home position is displayed in the operation area in the above embodiment, the home position may be indicated by a symbol or a dot, not limited to the character. Further, a condensed software keyboard may be displayed in the operation area.

Further, although the software keyboard displayed in the operation area and the display area is condensed in the description of the above embodiment, the size of the software keyboard is arbitrary, and the display size may be varied according to the user's eyesight.

Further, the operation area and the display area can be displayed by automatically changing their directions for easier user operation when the display screen is either a vertical layout or a horizontal layout.

Further, although an input operation is performed by using rule of the key layout on the basis of the software keyboard in the QWERTY layout in the above embodiment, it is applicable to the case of performing an input operation of only numerals by using the rule of the numeric keypad layout, or the case combining them.

However, although highlighting is necessary when each key of the software keyboard in the QWERTY layout is always displayed in the display area 16, highlighting of the input character is not necessary when each key is not always displayed, and another display method may be employed as long as a user can check the calculated input character.

Further, the touch panel used in the present invention may be an electrostatic or optical panel. Furthermore, a contact sensor of the device that detects a user's input operation may be a touch sensor, a touch panel, a touch screen, a touch pad or the like having a matrix switch, a resistive switch, a surface acoustic wave switch or the like.

The present application contains subject matter related to that disclosed in Japanese Priority Patent Application JP 2009-182449 filed in the Japan Patent Office on Aug. 5, 2009, the entire content of which is hereby incorporated by reference.

What is claimed is:

1. A display apparatus comprising:
    a display screen;
    an operation area control unit that displays an operation area for a user to perform an input operation on the display screen, wherein said operation area includes a software input keyboard configured to receive character input from a user;
    a display area control unit that displays a display area that is spatially separated from said operation area for displaying input information on the display screen, wherein said displaying input information comprises displaying a software display keyboard, wherein the software display keyboard is configured to display the entry of characters from a user that is input into the separate software input keyboard;
    a device that is provided to the display screen and detects an input operation performed by a user in the operation area;
    an arithmetic unit that selects input information based on the input operation detected by the device; and
    an input information presentation unit that presents the input information selected by the arithmetic unit in the display area to prompt the user to check the input information.

2. The display apparatus according to claim 1, wherein the display area is displayed at a position that allows checking whether the selected input information is information corresponding to the input operation performed by a user in the operation area.

3. The display apparatus according to claim 1, wherein the operation area and the display area are displayed in positions not overlapping with each other on the display screen.

4. The display apparatus according to claim 1, further comprising:
    a determination unit that determines whether to use or discard the input information depending on a user's response operation with respect to the input information displayed in the display area.

5. The display apparatus according to claim 1, wherein the operation area control unit determines the operation area by using a position where a user first touches as a reference.

6. The display apparatus according to claim 1, wherein a home position to serve as a reference of an input operation is displayed in the operation area.

7. The display apparatus according to claim 6, wherein the arithmetic unit calculates a relative displacement from the home position to the detected input operation and selects input information corresponding to the relative displacement.

8. The display apparatus according to claim 1, wherein the input information presentation unit presents a position of the selected input information on the software display keyboard in the display area.

9. The display apparatus according to claim 1, wherein the device is a transmission touch panel capable of detecting the user's input operation.

10. The display apparatus according to claim 1, wherein the operation area control unit updates display of the operation area in response to a given operation on a reset button or a touch panel provided to the display apparatus, and
the display area control unit updates display of the display area in response to update of display of the operation area.

11. An information input method comprising the steps of:
displaying an operation area for a user to perform an input operation on a display screen of a display apparatus, wherein said operation area includes a software input keyboard configured to receive character input from the user;
displaying a display area that is spatially separated from said operation area for displaying input information on the display screen, wherein said displaying input information comprises displaying a software display keyboard, wherein the software display keyboard is configured to display the entry of characters from a user that is input into the separate software input keyboard;
detecting an input operation performed by a user in the operation area by using a device provided to the display screen;
selecting input information based on the input operation detected by the device; and
presenting the selected input information in the display area to prompt the user to check the input information.

12. The information input method according to claim 11, wherein
the display area is displayed at a position that allows checking whether selected input information is information corresponding to the input operation performed by a user in the operation area.

13. The information input method according to claim 11, wherein the operation area and the display area are displayed in positions not overlapping with each other on the display screen.

14. The information input method according to claim 11, further comprising:
a determination unit that determines whether to use or discard the input information depending on a user's response operation with respect to the input information displayed in the display area.

15. The information input method according to claim 11, determining the operation area by using a position where a user first touches as a reference.

16. The information input method according to claim 11, wherein
a home position to serve as a reference of an input operation is displayed in the operation area.

17. The information input method according to claim 16, comprising calculating a relative displacement from the home position to the detected input operation and selects input information corresponding to the relative displacement.

18. The information input method according to claim 17, comprising presenting a position of selected input information on the software display keyboard in the display area.

19. The information input method according to claim 11, comprising updating display of the operation area in response to a given operation on a reset button or a touch panel provided to the display apparatus, and
updating display of the display area in response to update of display of the operation area.

20. A non-transitory computer-readable medium having embodied thereon a program, which when executed by a computer, causes the computer to execute a process comprising the steps of:
displaying an operation area for a user to perform an input operation on a display screen of a display apparatus, wherein said operation area includes a software input keyboard configured to receive character input from the user;
displaying a display area that is spatially separated from said operation area for displaying input information on the display screen, wherein said displaying input information comprises displaying a software display keyboard, wherein the software display keyboard is configured to display the entry of characters from a user that is input into the separate software input keyboard;
detecting an input operation performed by a user in the operation area by using a device provided to the display screen;
selecting input information based on the input operation detected by the device; and
presenting the selected input information in the display area to prompt the user to check the input information.

* * * * *